United States Patent [19]

Gojon

[11] Patent Number: 4,889,435
[45] Date of Patent: Dec. 26, 1989

[54] BEARINGS HAVING UPPER AND LOWER HALVES OF DIFFERENT MATERIALS

[75] Inventor: Roger L. Gojon, Annecy, France

[73] Assignee: The Glacier Metal Company Limited, Northwood Hills, England

[21] Appl. No.: 240,709

[22] Filed: Sep. 6, 1988

[30] Foreign Application Priority Data

Sep. 5, 1987 [GB] United Kingdom ............... 8720915

[51] Int. Cl.⁴ .................. F16C 33/02; F16C 33/10
[52] U.S. Cl. ............................ 384/276; 384/288; 384/294; 384/913
[58] Field of Search ............ 384/273, 276, 282, 286, 384/288, 294, 429–433, 912, 913

[56] References Cited

U.S. PATENT DOCUMENTS 4,188,079 2/1980 Mori .................................. 384/294

FOREIGN PATENT DOCUMENTS 1525284 1/1970 Fed. Rep. of Germany ...... 384/276
2711938 9/1977 Fed. Rep. of Germany ...... 384/288
3621577 2/1987 Fed. Rep. of Germany ...... 384/282
1577562 10/1980 United Kingdom .
2150986 7/1985 United Kingdom .

OTHER PUBLICATIONS

Wood, D. B., "Important Engineering Data on Aluminum Alloy Bearings for Engines", *Automotive and Aviation Industries*, Jun. 1, 1946, pp. 26–30, 74, 76.

Primary Examiner—Thomas R. Hannon
Attorney, Agent, or Firm—William R. Hinds

[57] ABSTRACT

Journal bearings comprising two half bearings are described. Only one half bearing, in the highest loaded position, has an overlay coating. Preferably the non-overlay coated half comprises a silicon containing aluminum alloy which exerts a polishing action on the shaft journal thus decreasing the degree of abrasiveness of the journal. The non-overlay coated half may also be profiled to allow accelerated polishing of the shaft journal.

7 Claims, 1 Drawing Sheet

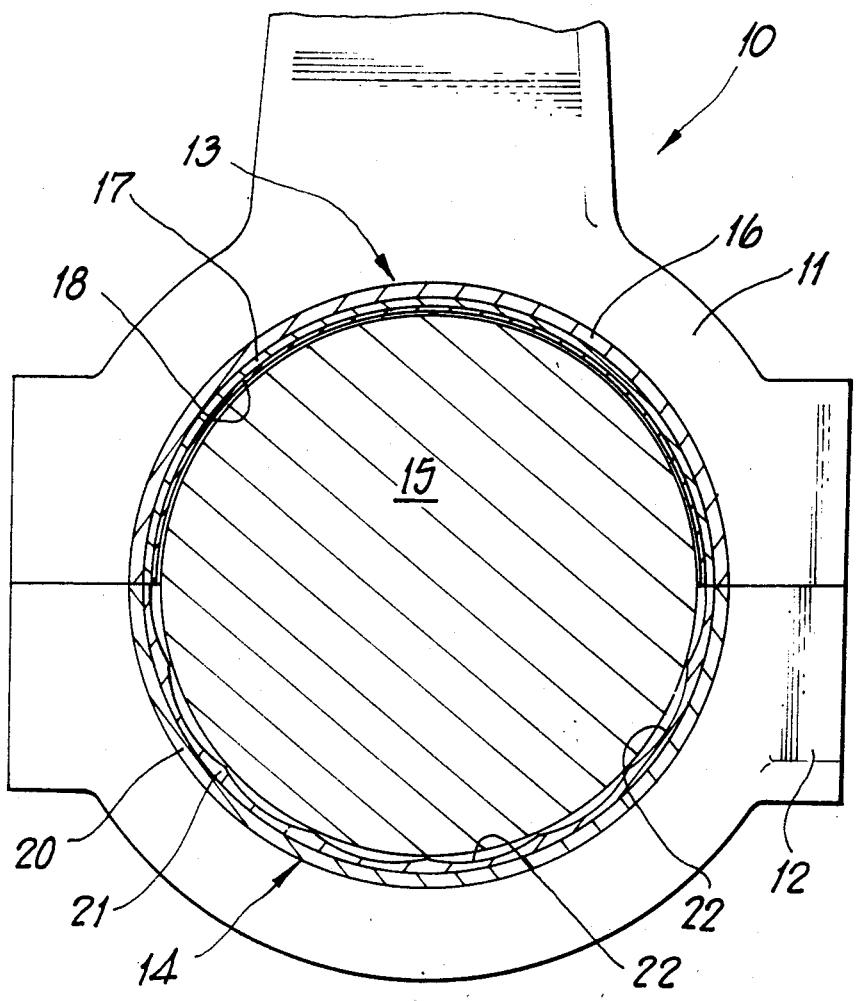

BEARINGS HAVING UPPER AND LOWER HALVES OF DIFFERENT MATERIALS

The present invention relates to bearings and particularly to bearings for internal combustion engines.

Bearings for the crankshaft main and connecting rod large-end journals generally comprise two halves. Each half usually comprises a steel-backed bearing material which may also have deposited thereon a thin layer of a second bearing material. The second material, often referred to as an overlay, is usually electro-deposited and comprises a soft lead or tin-based alloy.

Such overlay coatings are usually employed in highly rated engines to improve the fatigue and seizure resistance of the bearing. They also serve on some underlying bearing materials to prevent corrosion thereof.

Although overlay coatings improve the performance of the bearing, the alloys used, being soft, tend to wear rapidly when in contact with the crankshaft. Once the overlay has been worn through both seizure and possibly corrosion-resistance are deleteriously affected.

Merely increasing the thickness of the overlay, to give greater wear capacity is limited due to fatique resistance being reduced by the greater thickness.

Wear with a newly-machined crankshaft is caused by the relatively high roughness of the much harder ferrous crankshaft journal. The roughness of the crankshaft journal is not diminished by contact with the overlay material.

It has been noted, however, that once the overlay has been worn through and the journal comes into contact with the harder underlying bearing material, the crankshaft roughness is rapidly reduced.

It has also been noted that if such worn bearings are replaced with new overlay plated bearings the wear rate of the new bearing overlay is very much reduced.

Owing to the higher cost of overlay plated bearings their use is really only justified in the half where the loads are highest and hence the oil film is thinnest. The loads on the other half-bearing are much lower and mainly due to inertia loads rather than firing loads. Such loads do not lead to either seizure conditions or to fatigue damage.

An object of the present invention is to provide a journal bearing which reduces the roughness of the shaft journal and consequently reduces the wear rate of overlay coatings.

According to the present invention a journal bearing comprises two half-bearings only one of which has an overlay coating thereon and which is in the position sustaining the greatest bearing loads.

It has been found that bearing alloys containing silicon are particularly advantageous for use in the non-overlay coated half. The silicon phase is considered to be responsible for a much enhanced polishing action on the shaft journal.

It has also been found to be advantageous to profile the bore of the non-overlay coated half so as to reduce the hydrodynamic lift capacity of the half-bearing for an initial period. Normally the bearing halves are perfectly semi-circular when installed, such a shape giving the maximum oil film thickness. Small deviations from semi-circularity may be introduced. The profile may, for example, be made up of pockets and cusps spaced 5 to 15 mm apart and a depth of 1 to 5 micrometres deviation from a true cylinder. The effect of such a profile is to reduce the oil film thickness and initially favour contact between the shaft and parts of the surface of the non-overlay plated half. After a relatively short period of engine running the cusps are themselves worn away to produce a near perfect semi-cylindrical shape allowing maximum oil film thickness to be attained. At this stage the shaft journal roughness has been polished to a lower, less abrasive level. The deviations from semi-circularity may take many forms such as lobes having stepped or sinusoidal profile for example.

In order that the present invention may be more fully understood an example will now be described by way of illustration only with reference to the accompanying drawing which shows a diagrammatic section in elevation through a connecting rod big-end journal bearing.

Referring now to the drawing and where a connecting rod big-end journal bearing assembly is shown generally at 10. The assembly comprises a connecting rod portion 11 and cap 12, an upper bearing half 13 and a lower bearing half 14. The shaft journal is shown at 15. The upper half 13 comprises a steel backing 16, a bearing lining 17 comprising a cooper-lead alloy and an overlay coating 18 comprising lead 10 tin (all compositions are in weight %) having a thickness of about 25 micrometres. The lower half 14 also comprises a steel backing 20 having a lining of a bearing alloy 21 having a composition aluminium-11 tin-4 silicon-2 copper. The surface of the alloy 21 is also profiled into a series of pockets and cusps 22 having a wavelength of about 10 mm and a depth of 2 micrometres.

In operation the effect of the pockets and cusps 22 is to reduce the oil film thickness on the half 14 and allow contact between the cusp peaks and the shaft journal surface thus accelerating the polishing thereof. Simultaneously the cusp peaks are themselves worn away to leave a smooth profile on the half 14 thus restoring the desired oil film thickness and ensuring long service life.

Many other alloys may be used for the various bearing materials specified above and the invention should not be considered as being limited to such.

I claim:

1. A journal bearing comprising an upper and a lower half-bearing, said upper half-bearing being received in the rod portion of an engine connecting rod and said lower halfbearing being received in the cap portion of said connecting rod so as to receive a shaft journal passing through the bearing wherein said upper half-bearing includes a first bearing material layer having thereon a second, softer overlay bearing material layer, and said lower half-bearing has a running surface of a different material comprising a silicon containing aluminium alloy for effecting a relatively enhanced polishing action on the shaft journal to reduce the wear rate of said overlay material on said upper half-bearing.

2. A journal bearing according to claim 1 wherein said silicon containing aluminium alloy has a composition comprising in weight %; 11 tin; 4 silicon; 2 copper; balance aluminium.

3. A journal bearing according to claim 1 wherein the lower half-bearing has a bore surface profile which is noncircular so as to reduce the oil film thickness and initially favor contact between the shaft and parts of the running surface of said lower half-bearing.

4. A journal bearing according to claim 3 wherein said born surface profile comprises a generally sinusoidal lobe pattern.

5. A journal bearing according to claim 4 wherein the wavelength of said lobes is 5 to 15 mm and the depth is 1 to 5 micrometres deviation from the circular.

6. A journal bearing according to claim 3 wherein the bore surface profile comprises a series of pockets and cusps.

7. A journal bearing according to claim 6 wherein the wavelength of said cusps is from 5 to 15 mm and said pocket depth is 1 to 5 micrometres deviation from circular.

* * * * *